(12) United States Patent
Dussaume et al.

(10) Patent No.: US 10,180,239 B2
(45) Date of Patent: Jan. 15, 2019

(54) COMBINED ILLUMINATION AND OPTICAL COMMUNICATION DEVICE

(71) Applicant: ORANGE, Paris (FR)

(72) Inventors: Philippe Dussaume, Tremblay (FR); Micheline Perrufel, Pace (FR); Olivier Bouchet, Rennes (FR)

(73) Assignee: Orange, Paris (FR)

( * ) Notice: Subject to any disclaimer, the term of this patent is extended or adjusted under 35 U.S.C. 154(b) by 127 days.

(21) Appl. No.: 15/077,774

(22) Filed: Mar. 22, 2016

(65) Prior Publication Data

US 2016/0281963 A1 Sep. 29, 2016

(30) Foreign Application Priority Data

Mar. 27, 2015 (FR) ...................... 15 52604

(51) Int. Cl.
| | |
|---|---|
| *F21V 14/06* | (2006.01) |
| *H04B 10/114* | (2013.01) |
| *H04B 10/116* | (2013.01) |
| *F21V 5/00* | (2018.01) |
| *H04B 10/50* | (2013.01) |
| *F21Y 105/00* | (2016.01) |

(52) U.S. Cl.
CPC .............. *F21V 14/06* (2013.01); *F21V 5/007* (2013.01); *H04B 10/116* (2013.01); *H04B 10/1141* (2013.01); *H04B 10/502* (2013.01); *F21Y 2105/003* (2013.01)

(58) Field of Classification Search
CPC .............. H04B 10/502; H04B 10/1141; H04B 10/116; F21V 14/06; F21V 14/065; F21V 5/007

USPC ................................................ 398/172, 201
See application file for complete search history.

(56) References Cited

U.S. PATENT DOCUMENTS

| | | | | |
|---|---|---|---|---|
| 2008/0215391 | A1* | 9/2008 | Dowling | G06Q 30/0201 705/7.29 |
| 2009/0297166 | A1* | 12/2009 | Nakagawa | G09F 9/33 398/172 |
| 2012/0121244 | A1* | 5/2012 | Stavely | F21V 5/007 396/175 |
| 2014/0301071 | A1* | 10/2014 | Jorgensen | F21V 14/06 362/231 |
| 2014/0341588 | A1* | 11/2014 | Pederson | H04B 10/40 398/128 |

OTHER PUBLICATIONS

Written Opinion from the FR1552604 application.

(Continued)

*Primary Examiner* — Karabi Guharay
*Assistant Examiner* — Michael Chiang
(74) *Attorney, Agent, or Firm* — Haverstock & Owens LLP (57) ABSTRACT

The invention relates to an illuminating device including a plurality of light sources mounted on a deck, the device being such that it includes a first set of light sources placed in a central zone of the deck and a second set of light sources placed in a peripheral zone of the deck, the light sources of one of the sets each being suitable for transmitting data by modulation of visible light, the light sources of at least one of the sets being associated with at least one fixed convergent first lens positioned on the axis of said sources.

5 Claims, 9 Drawing Sheets

(56) References Cited

OTHER PUBLICATIONS

Kumar Ambuj et al., "Visible Light Communications (VLC) for Ambient Assisted Livings", Wireless Personal Communications, Springer, Dordrecht, vol. 78, No. 3, Jul. 22, 2014, ISSN: 0929-6212, XP035381355.
Chen Hsi-Chao et al., "Investigation of optical intensity in indoor visible light communication with different LEDs array", vol. 9190, 201-09-25, ISSN: 0277-786X, XP060040421.
J-W Whang et al., "Designing Uniform Illumination Systems by Surface-Tailored Lens and Configurations of LED Arrays", Journal of Display Technology, IEE Service Center, vol. 5, No. 3, Mar. 1, 2009, ISSN: 1551-319X, XP01126756.
The French Search Report from the FR1552604 application.

\* cited by examiner

COMBINED ILLUMINATION AND OPTICAL COMMUNICATION DEVICE

TECHNICAL FIELD

The present invention relates to the field of wireless communications and more particularly to the field of the transmission of data based on the use of visible light.

PRIOR ART

Substantial progress has been made in the last few years in the field of wireless communications. In particular, connection standards such as 4G, Wi-Fi, Wimax or even Bluetooth allow users to access all sorts of services online with a very good quality of service. These technologies are based on the use of the electromagnetic spectrum to transmit data.

At the present time, technologies are emerging that allow high-bandwidth transmission of data by modulation of the visible light emitted by luminaries such as for example LED lamps (LED standing for light-emitting diode). LiFi (for light fidelity) is one exemplary wireless communication standard based on the use of visible light.

These transmission technologies have many advantages. They allow, by taking advantage of the many light fittings installed in dwellings, offices, means of transportation or public spaces, the number of points of network access to be multiplied without running the risk of saturating frequencies in the electromagnetic spectrum. They are also of interest for security reasons because the zone of coverage is visible to the naked eye and limited to the zone of illumination. Thus, such lamps, installed for example above desks in an open-space office, make it possible to guarantee for example that only those pieces of equipment that are directly illuminated by these lamps will be able to benefit from a connection.

To establish a connection with a specific piece of equipment it is sometimes useful to be able to orientate the light beam toward a particular location and to calibrate the size of this beam so that the data transmitted are only accessible from this location. To do this, it is possible to use an orientable spot, or indeed even more advantageously, to use an illuminating device offering the possibility of adjustment of the light beam, such as for example a lens-based device such as that described in International patent application WO 2012139335 A1.

Unfortunately, when the light beam is thus oriented and concentrated on a particular point, the ambient lighting capacity of the luminary is greatly decreased and other lamps, dedicated to the illuminating function, must be installed.

There is therefore a need for a technical solution allowing the characteristics of an information-bearing light beam to be modified without notable impact on the illuminating capacities of the device.

SUMMARY OF THE INVENTION

For this purpose, the invention relates to an illuminating device including a plurality of light sources mounted on a deck, characterized in that it includes:
  a first set of light sources placed in a central zone of the deck; and
  a second set of light sources placed in a peripheral zone of the deck,
the light sources of one of the sets being suitable for transmitting data by modulation of visible light, the light sources of at least one of the sets being associated with at least one fixed convergent first lens positioned on the axis of said sources.

The device comprises a deck on which the light sources are placed. It may for example be a question of a printed circuit board on which LEDs are placed. Some of the light sources, for example those located at the center of the deck, are suitable for transmitting data in the form of an optical signal. The rest of the light sources, placed for example on the periphery of the deck, offer a conventional illuminating function. The device furthermore includes a plurality of lenses arranged at least in front of the light sources suitable for transmitting data. The lenses intended for the central portion may have different characteristics from the lenses intended for the peripheral portion in order to produce beams the characteristics of which are different. The lenses are thus positioned so as to capture light issued from light sources and form a light beam the characteristics of which depend on the lenses used. Thus, the light sources suitable for illumination alone may not have lenses and emit a diffuse light that contributes to ambient lighting, whereas the light issued from the light sources able to transmit data may be concentrated into a beam allowing a particular location to be targeted. A single device according to the invention thus makes it possible to obtain a satisfactory ambient lighting while guaranteeing an optimal transfer of data to a specific location.

According to one particular embodiment, the device is such that the light sources are LEDs. The device may use LEDs for the illuminating function and for the data transmission. LEDs are particularly suitable for data transmission because they are inexpensive, compact, consume little power and have a high-frequency light modulation capacity enabling high transmission bandwidths.

According to one particular embodiment, the device is such that it furthermore includes, arranged parallel to the deck and superposed on the light sources and first lenses:
  A first element adapted to the central zone including a first set of divergent lenses, each of the lenses being arranged on the axis of a light source of the central zone; and
  A second element adapted to the peripheral zone including a second set of divergent lenses, each of the lenses being arranged on the axis of a light source of the peripheral zone.

Divergent lenses are arranged on the axis of the light sources so as to receive the light issued from the light sources or from the convergent first lenses. The divergent lenses of the first set may have characteristics different from those of the second set. The device may thus emit two concentric light beams the beam angles of which are different. In this way, the device may offer for example a first narrow beam intended to transmit data to a precise location and a second wider beam intended for ambient lighting. The fixed convergent first lenses associated with the light sources allow the light emitted by the light sources to be concentrated on the divergent lenses.

According to one particular embodiment, the device is such that the first and second elements are translationally movable along an axis perpendicular to the deck.

The first and second elements may thus be moved while remaining parallel to the deck on which are mounted the first and second sets of light sources. It is thus possible to adjust independently the distance between the first element adapted to the central zone and the light sources of the central zone, and the distance between the second element adapted to the peripheral zone and the light sources of the peripheral zone.

The first and second elements are movable only by translation along an axis perpendicular to the deck bearing the light sources so as to preserve the alignment of the sources, convergent first lenses and divergent lenses.

The device thus makes it possible to modify the characteristics of the beams emitted by the device by modifying the distance between the light source and the divergent lens.

According to one particular embodiment of the invention, the device includes an adjusting mechanism suitable for applying a translation along an axis perpendicular to the deck to at least one of the sets of divergent lenses.

The adjusting mechanism makes it possible for a user to adjust at least one of the light beams emitted by the device. For example, the device may include a first adjusting wheel allowing the distance between the first set of divergent lenses and light sources to be adjusted, and a second adjusting wheel allowing the distance between the second set of divergent lenses and light sources to be adjusted.

The beams emitted by the device may thus be modified by a user. For example, in the case where the light sources of the central portion are suitable for transmitting data whereas the sources of the peripheral portion are suitable for an illuminating function alone, a user may increase or decrease the separation between the first element corresponding to the central zone and including light sources suitable for the transmission of data and the convergent first lenses in order to obtain an illuminating beam of greater or lesser beam angle.

LIST OF THE FIGURES

Other features and advantages of the invention will become more clearly apparent on reading the following description of one particular embodiment, given by way of simple illustrative and nonlimiting example, and the appended drawings, in which.

DETAILED DESCRIPTION

FIGS. 1 to 4 show, according to one particular embodiment, various constituent elements of a combined illumination and optical communication device.

Figure 1:
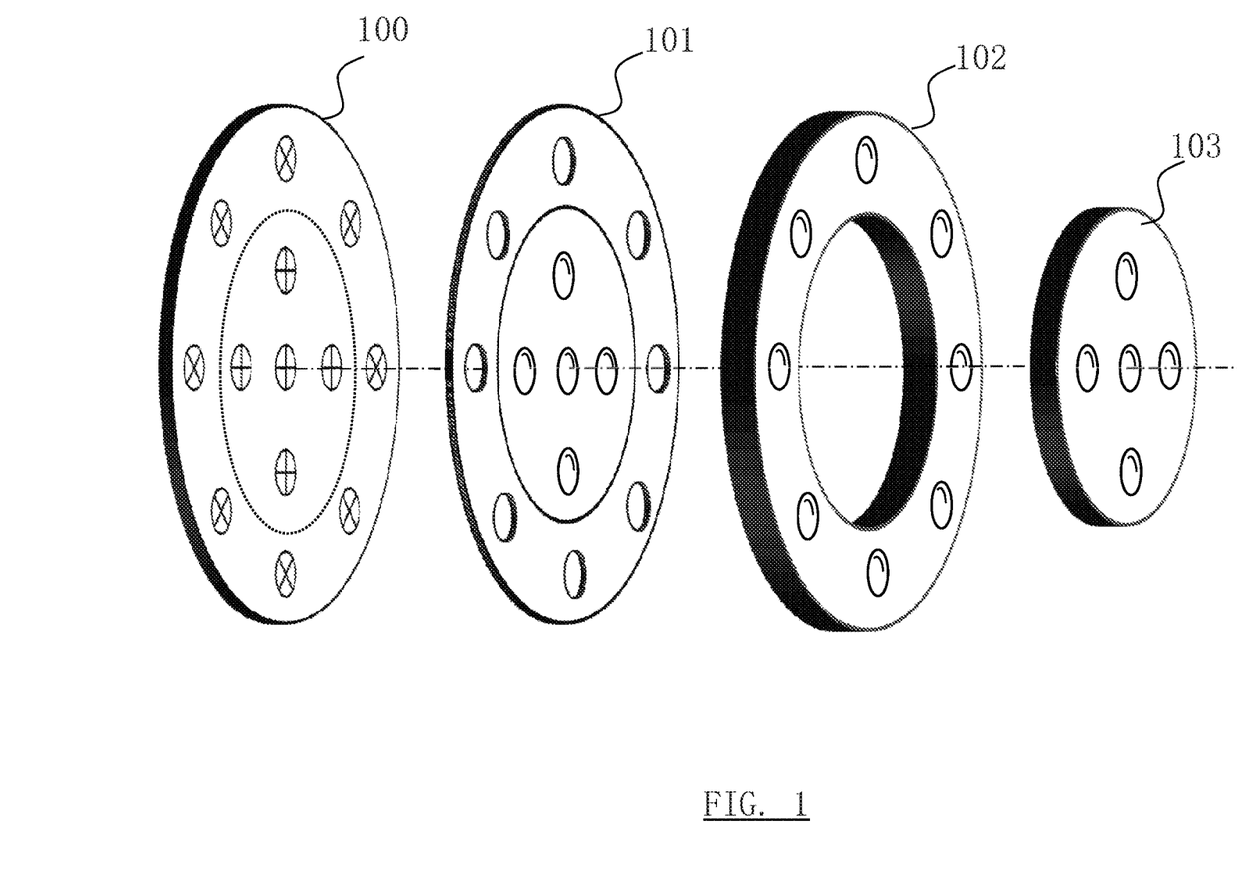
FIG. 1 schematically illustrates various component elements of the illuminating device, according to one particular embodiment of the invention.
Figure 2:
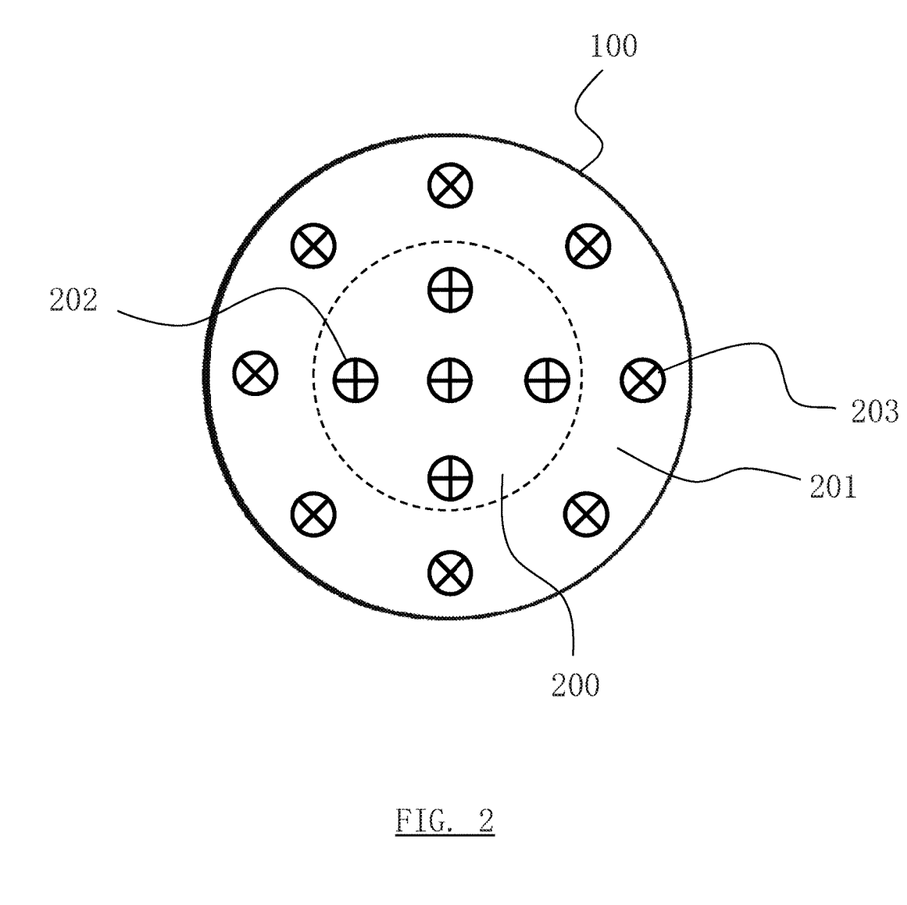
FIG. 2 shows a circular deck on which two sets of light-emitting diodes are placed according to one particular embodiment.

On a circular deck 100 are placed light sources, such as for example light-emitting diodes. A central zone 200 of the deck 100 bears LEDs suitable for transmitting data in the optical spectrum. For example, the LED 202 is able to transmit data by modulation of visible light. To do this, these LEDs are for example connected to a suitable modulating component, such as for example the microcontroller RL78/I1A sold by Renesas™. The central portion 200 may comprise one or more LEDs. A peripheral zone 201 bears LEDs dedicated only to providing illumination, which are not suitable for transmitting data. For example, the LED 203 shown in FIG. 2 is not connected to a modulating component and serves only to provide illumination. According to another embodiment, the light sources allowing data to be transmitted are located in the peripheral zone whereas the LEDs participating only in the provision of illumination are located in the central zone.

Figure 3:
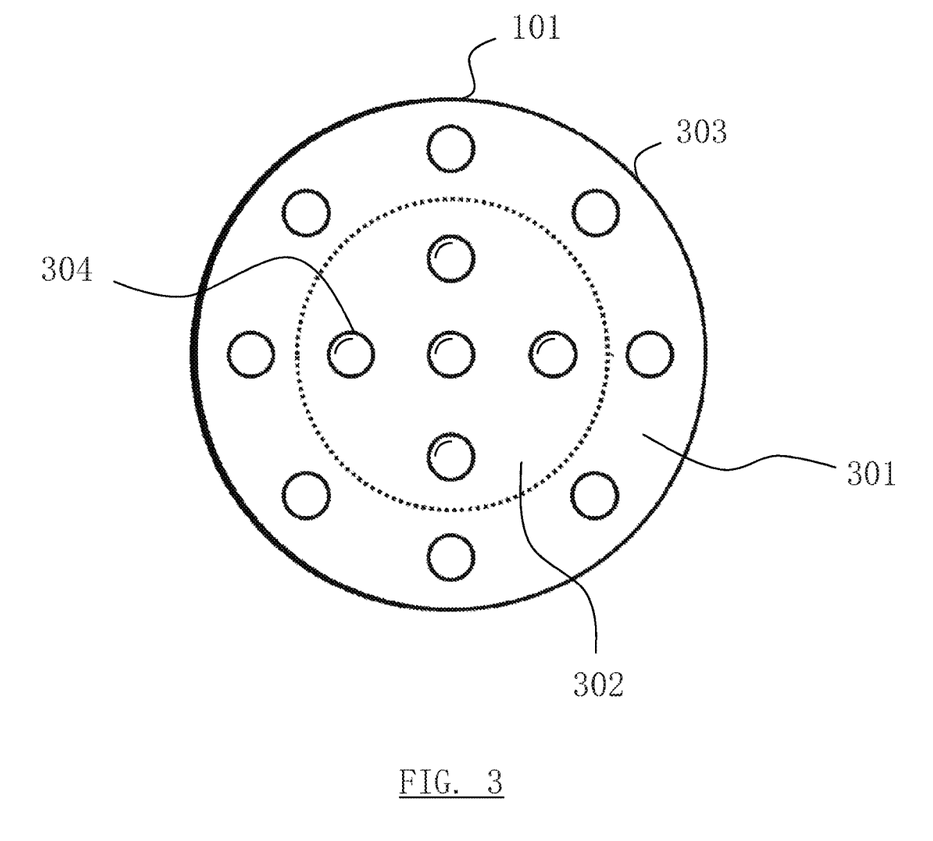
FIG. 3 illustrates an optical element composed of an assembly of convergent lenses according to one particular embodiment of the invention.

A carrier 101 comprises a central zone 302 corresponding to the central zone 200 of the deck 100 and a peripheral zone 301 corresponding to the peripheral zone 201 of the deck 100. Convergent lenses, such as the lens 304, are mounted in locations provided for this purpose in the central zone 302. The location of the convergent lenses is determined so that each lens is positioned facing a light source when the carrier 101 is positioned on the deck 100. Thus, the light emitted by a light source of the central zone of the deck 100 is received by a lens and redirected into a convergent beam.

According to one particular embodiment, the convergent lenses are mounted in locations provided in the peripheral zone of the carrier 101. The location of the convergent lenses is determined so that each lens is positioned facing a light source when the carrier 101 is positioned on the deck 100. Thus, the light emitted by a light source of the peripheral zone of the deck 100 is received by a lens and redirected into a convergent beam.

According to one particular embodiment, convergent lenses are mounted in locations of the central zone and in locations of the peripheral zone, the locations corresponding to the locations of the light sources when the carrier 101 is assembled with the deck 100. The lenses of the central zone and those of the peripheral zone possibly have different optical characteristics.

According to one particular embodiment, the carrier 101 and the deck 100 are a single object, the convergent lenses then being directly integrated into the light sources. It may for example be a question of LEDs comprising integrated optics or LEDs to which lenses have been added using a lens holder.

In this way, the device allows two concentric beams to be produced one of which is used to transmit data and the other of which is used only to provide illumination, the beams possibly having different characteristics such as for example a wide beam angle for the exterior beam dedicated to only providing illumination and a narrow beam angle for the internal beam having a data transmission capacity. Such a device may advantageously be mounted on a lamp fitting of standard dimensions, such as for example a spot lamp type, so as to be able to be easily installed in locations already provided for lighting.

Figure 4A:
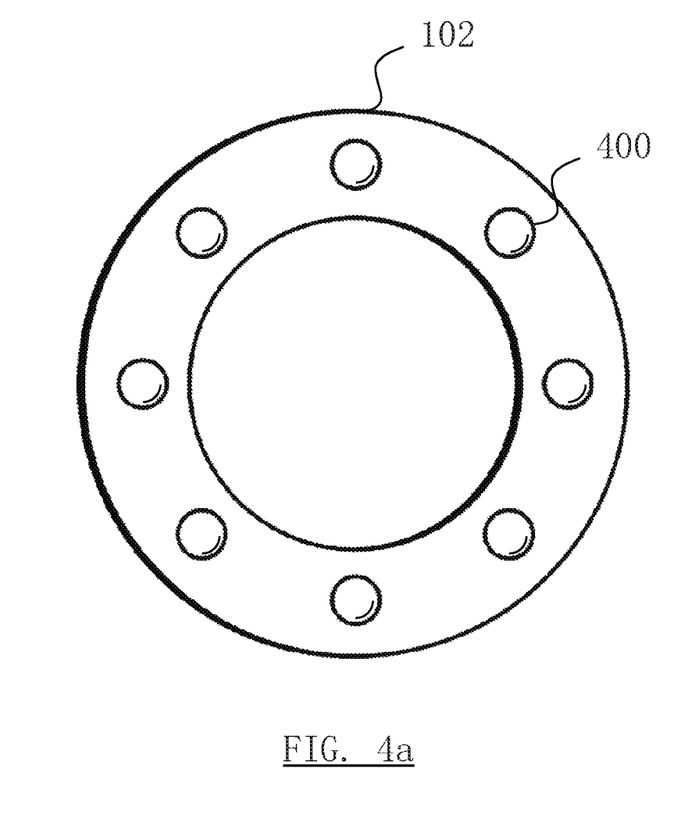
FIG. 4a shows a ring comprising a set of divergent lenses.
Figure 4B:
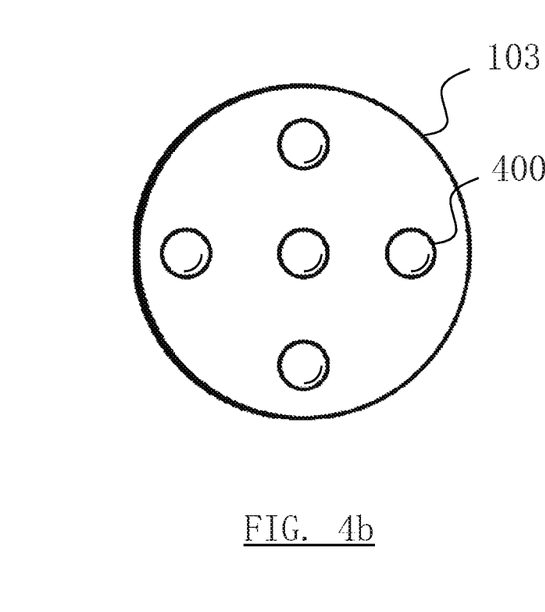
FIG. 4b shows a disk comprising another set of convergent lenses.

According to one particular embodiment, the device furthermore comprises a first element 103 adapted to the central zone including a first set of divergent lenses such as for example a lens 400, each of the lenses being arranged on the axis of a light source of the central zone, and a second element 102 adapted to the peripheral zone including a second set of divergent lenses, each of the lenses being arranged on the axis of a light source of the peripheral zone. It is thus possible to obtain two beams the characteristics which differ by positioning the elements 102 and 103 at different distances from the carrier 101, respectively.

Figures 5A, 5B:
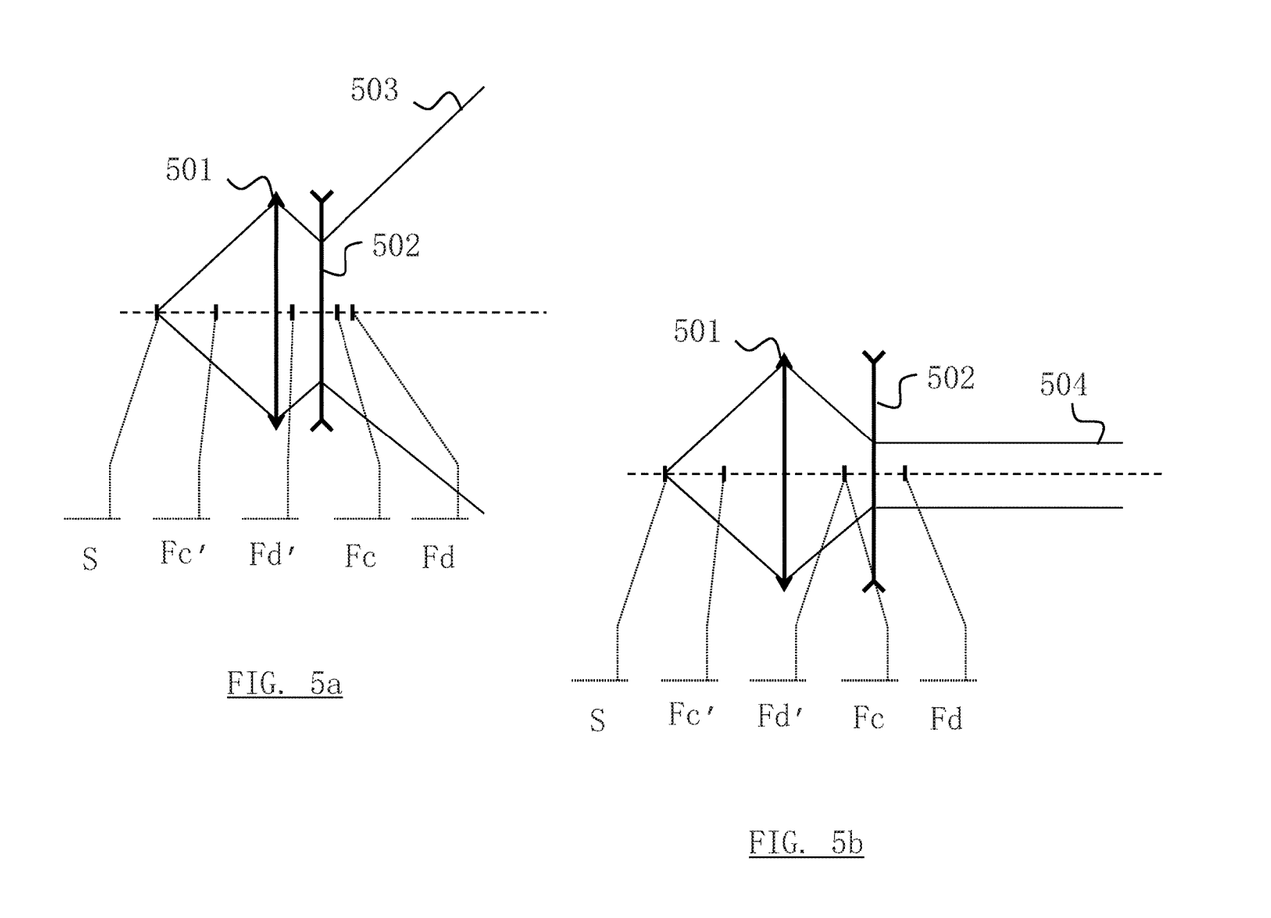
FIGS. 5a and 5b illustrate an assembly of convergent and divergent lenses suitable for producing a particular light beam from a light source.

FIGS. 5a and 5b illustrate two exemplary arrangements of a convergent lens and a divergent lens relative to a light source S. In this example, the focal length of the divergent lenses 502 mounted on the elements 102 and 103 corresponds to half the focal length of the convergent first lenses 501 of the carrier 101. Thus, if for example the focal points Fc and Fc' of the lens 501 are located at 10 mm from the optical center of the lens 501, the focal points Fd and Fd' of the lens 502 are located at 5 mm from the optical center of the lens 502. The convergent lens 501 is positioned so that the distance between the light source S and the focal point Fc' is identical to the distance between the focal point Fc' and the optical center of the lens 501.

FIG. 5a illustrates a case where the divergent lens 502 is positioned between the optical center of the convergent lens 501 and its focal point Fc. In this configuration, the light emitted by the source S produces a beam 503 possessing a wide beam angle on exiting the divergent lens 502.

FIG. 5b illustrates a case where the divergent lens 502 is positioned so that the focal points Fc and Fd' are superposed, i.e. the focal point Fd is at a distance from the optical center of the lens 501 that is equal to the distance between the source S and the optical center of the lens 501. In this configuration, the light emitted by the source S produces a narrow parallel beam 504 on exiting the divergent lens 502.

According to one particular embodiment, the first and second elements 103 and 102 are translationally movable along an axis perpendicular to the deck. Since the elements 102 and 103 bear the divergent lenses, it is thus possible to vary the distance between the convergent lenses of the carrier 101 and the divergent lenses of the elements 102 and 103 so as to modify the characteristics of the beams. The distance between the carrier 101 and the element 103 may be different from the distance between the carrier 101 and the element 102. In this way, it is possible to obtain two concentric beams of different characteristics as output from the device. In particular, the device makes it possible to produce both a narrow beam issued from the light sources suitable for transmitting data, and a wider beam issued from the light sources intended only to provide illumination.

Figure 6A:
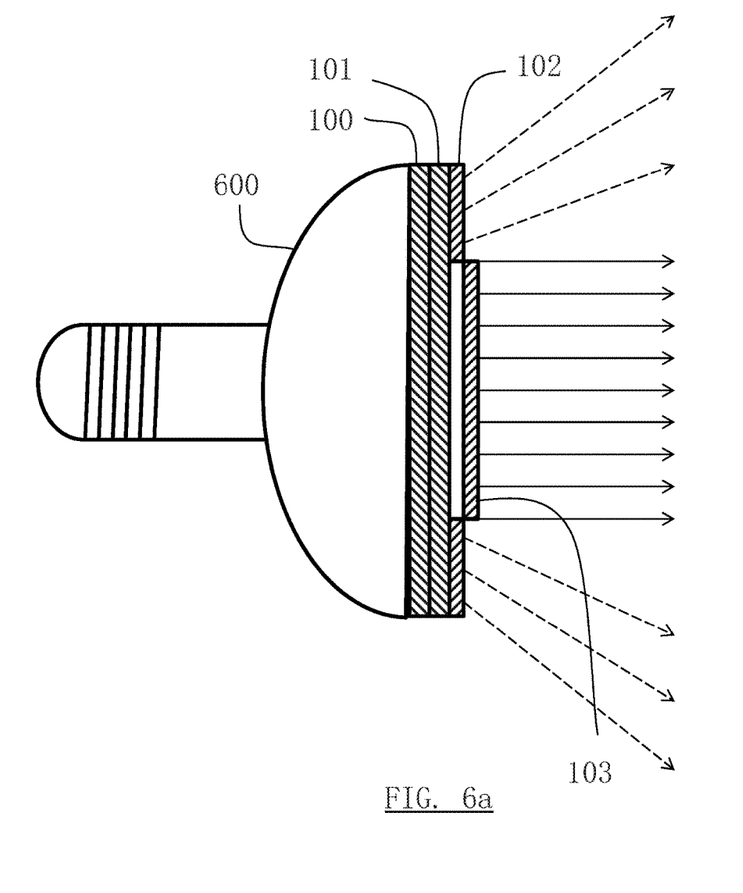
FIG. 6a shows an exemplary arrangement of the components of the device, according to one particular embodiment, allowing two light beams of different characteristics to be produced.
Figure 6B:
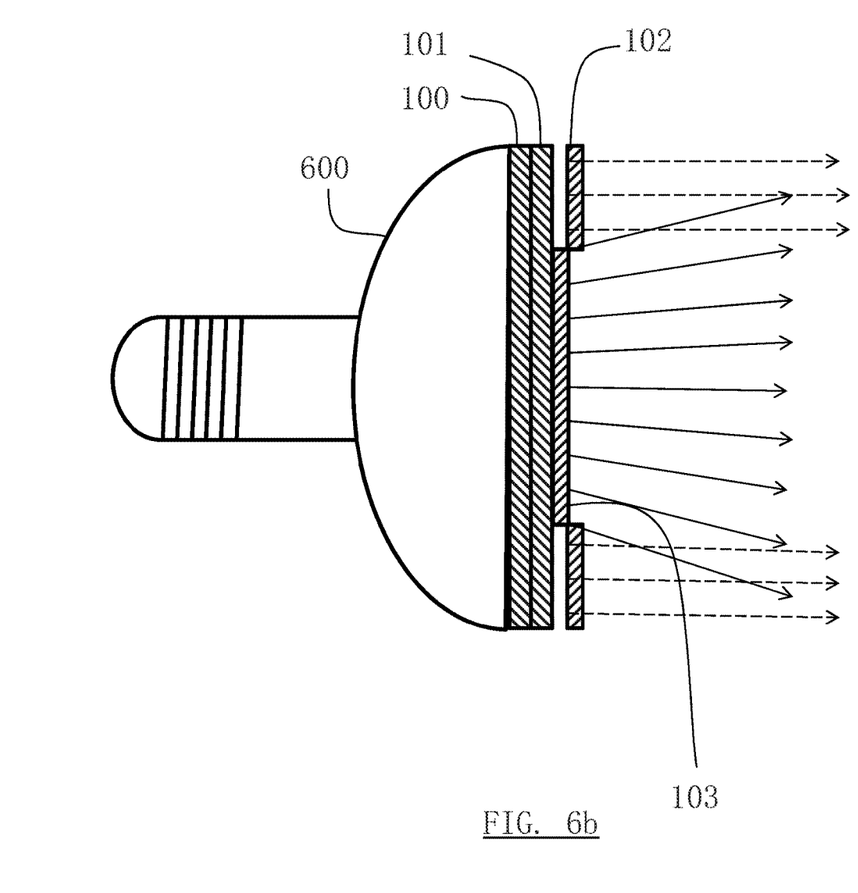
FIG. 6b shows another arrangement of the components of the device, according to one particular embodiment, allowing two other light beams of different characteristics to be produced.

FIGS. 6a and 6b show a schematic cross section of a device according to one particular embodiment of the invention. A carrier 101 including convergent lenses is positioned on a deck 100 on which light sources are mounted, the carrier being arranged so that each convergent lens is positioned facing a light source. The elements 102 and 103 adapted to the peripheral zone and to the central zone of the device, respectively, comprise divergent lenses, the light sources, convergent lenses and divergent lenses being aligned. The elements 102 and 103 are only movable by translation along an axis perpendicular to the deck 100, thus making it possible to vary the distance between the convergent lenses and the divergent lenses while preserving the alignment of the sources, convergent lenses and divergent lenses.

FIG. 6a shows the device 600 in a configuration in which the central element 103 has undergone a translation relative to the carrier 101 so that the distance between the carrier 101 of convergent lenses and the central element 103 is larger than the distance between the carrier 101 and the peripheral element 102. This configuration allows the light emitted by the sources of the central zone to be concentrated into a narrow beam.

FIG. 6b shows the device 600 in a configuration in which the peripheral element 102 has undergone a translation relative to the carrier 101 so that the distance between the carrier 101 of convergent lenses and the peripheral element 102 bearing the divergent lenses is larger than the distance between the carrier 101 and the central element 103. This configuration allows a wide zone to be illuminated by the light sources of the central portion while restricting the zone illuminated by the sources of the peripheral portion.

According to one particular embodiment, the maximum separation between the carrier 101 and the elements 102 and 103 is reached when the focal points Fc of the convergent lenses borne by the carrier 101 are superposed on the focal points Fd' of the divergent lenses borne by the elements 102 and 103. The device then produces a rectilinear beam. The minimum spacing between the carrier 101 and the elements 102 and 103 is reached when the object focal points of the divergent lenses borne by the elements 102 and 103 are superposed on the optical centers of the convergent first lenses of the carrier 101.

Figure 7:
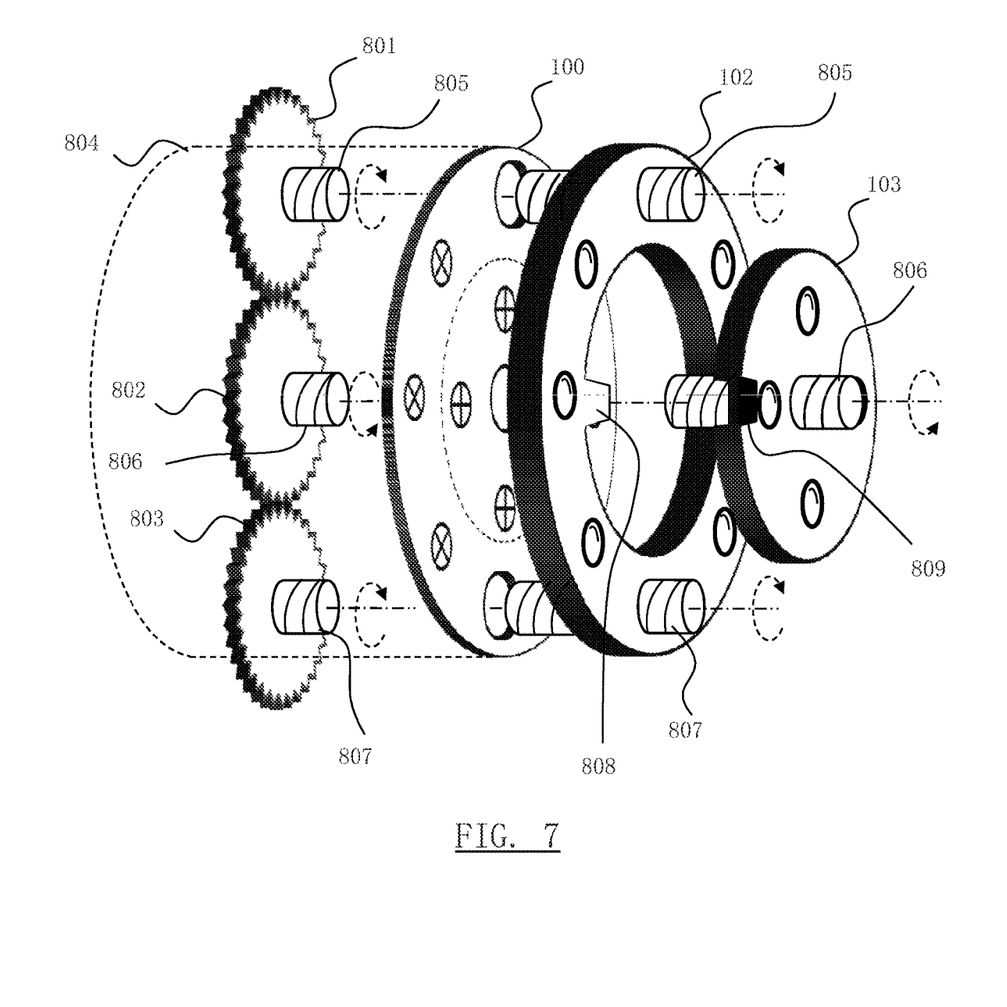
FIG. 7 schematically shows an exploded view of a device according to the invention.

FIG. 7 illustrates a nonlimiting exemplary mechanism allowing a user to adjust the position of the elements 102 and 103 relative to the carrier 101 while preserving the alignment of the light sources, convergent lenses and divergent lenses.

The device comprises a circular carrier 100 on which light sources such as LEDs are mounted. The LEDs are distributed in a central first zone and a peripheral second zone. The sources placed in the central zone are suitable for transmitting data by modulation of the emitted light. The light sources of the peripheral zone are for example LEDs endowed only with a conventional illuminating function.

For this, the device comprises a modulator suitable for modulating the light emitted by the LEDs of the central portion. According to one particular embodiment, the device furthermore comprises a power-line communication, Wi-Fi or even for example Bluetooth network interface. Thus, the data received via the network interface may be retransmitted by the LEDs of the central zone according to a protocol such as the LiFi protocol. According to one particular embodiment, the device may furthermore comprise infrared LEDs suitable for transmitting data in nonvisible light.

The LEDs used in this example are equipped with an integrated convergent lens. According to one particular embodiment, the convergent lenses are mounted on a carrier such as the carrier 101 described with reference to FIG. 3a.

The deck bearing the LEDs includes three orifices, one orifice being positioned at the center of the deck, the two other orifices being radially opposite and located in the peripheral zone. These orifices are suitable for letting threaded rods 805, 806 and 807 turn freely therein.

The device also comprises a circular-ring-shaped element 102 bearing divergent lenses. The element 102 includes two radially opposite tapped orifices suitable for receiving the threaded rods 805 and 806, in order that they may be screwed therein, the orifices being positioned so as to correspond to the orifices produced in the deck 100. The divergent lenses are arranged so as to correspond to the LEDs of the peripheral zone of the deck when the orifices of the deck 100 and of the element 102 are superposed.

The device also includes an element 103 corresponding to the central zone of the deck and including at its center a tapped orifice suitable for receiving and screwing a threaded rod 806. The element 103 includes divergent lenses placed so as to correspond to the LEDs of the central portion of the deck 100. The element 102 furthermore includes a void 809 intended to receive a key 808 that is securely fastened to the element 102 so as to make the elements 102 and 103 rotate as one while allowing the elements 102 and 103 to move one relative to the other along a path perpendicular to the deck 100.

The threaded rods 805, 806 and 807 are extended in the interior of a housing 804 by three toothed wheels 801, 802 and 803, the toothed wheels 801 and 803 lying flush with the exterior of the housing so that they can be rotated by an action of the user, the toothed wheel 802 being arranged at the center of the housing and making contact with the wheels 801 and 803. Thus, when a clockwise rotation is applied to the wheel 801, a counterclockwise rotation movement is transmitted to the central wheel 802, the central wheel 802 transmitting in its turn a clockwise rotation movement to the toothed wheel 803.

The toothed wheels 801, 802 and 803 are securely fastened to the threaded rods 805, 806 and 807, respectively. Thus, a rotation of a toothed wheel applies a rotation to the corresponding threaded rod. The rotation of the threaded rods 805 and 807 in the corresponding tapped orifices in the element 102 allows a translation to be applied along a path perpendicular to the deck 100. Since the central wheel 802 is driven by the rotation of the wheels 801 and 803, the rotation of the threaded rod 806 in the tapped orifice of the element 103 allows a translation along a path perpendicular to the deck 100 to be applied to said element in a direction opposite to the translation applied to the element 102.

In this way, the device allows, via a simple action of a user on a toothed wheel lying flush with the housing, the characteristics of a light beam able to transmit data and those of a second light beam intended to provide illumination to be modified simultaneously.

Figure 8:
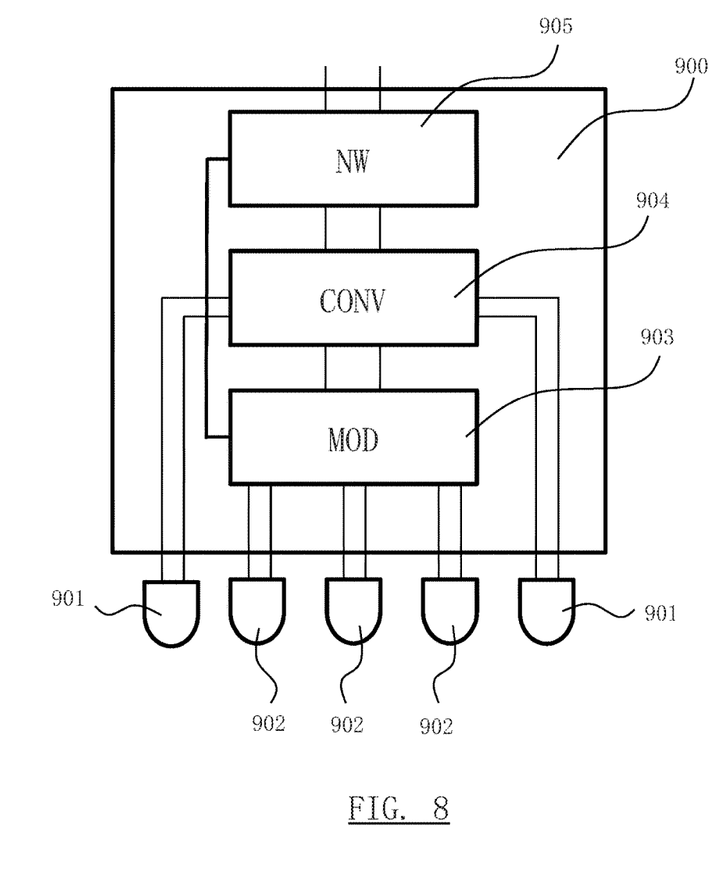
FIG. 8 illustrates in a simplified and nonlimiting way an assembly of electronic components, which assembly is suitable for delivering an illuminating function alone and an illuminating function with transmission of data according to one particular embodiment of the invention.

FIG. 8 illustrates in a simplified and nonlimiting way an assembly of electronic components suitable for delivering an illuminating function alone and an illuminating function with data transmission according to one particular embodiment of the invention.

The assembly may be integrated into a housing 900, such as for example into a bulb or a bulb reflector. The device includes a first set of LEDs 901 connected to an electrical power supply 904 (CONV). The device also includes a second set of LEDs 902 connected to a modulating component (MOD) suitable for varying at high frequency the illumination delivered by the LEDs 902 so as to transmit data by way of visible light. It may be a question of a microcontroller capable of functioning at high frequency and programmed for this purpose. For example, the microcontroller RL78/I1A sold by Renesas™ may be adapted to such an implementation. The modulating component 903 is connected to the power supply 904. Thus, the LEDs 901 are able to deliver only an illuminating function whereas the LEDs 902 may, in addition to an illuminating function, provide a data transmitting function. In one particular embodiment, the device may furthermore include a communications module 905 (NW) suitable for receiving and interpreting data received by way of a communications network. For example, the communications module may be a network interface implementing a power-line communication (PLC) transmission technology or a Bluetooth or even Wi-Fi interface. The communications module 905 is connected to the modulating component 903. In this way, the device may retransmit in the spectrum of visible light data received from a communications network, while delivering a conventional illuminating function by way of the LEDs 901.

One particularly advantageous use of the device is in the case of illumination of a product in a shop. The device may then be configured to produce a first illuminating beam focused on the product and a second wider beam suitable for the transmission of data. The illuminating beam thus allows a product on a stand to be attractively presented whereas the wider data beam allows information relating to the product to be transmitted in a configurable perimeter around the product.

In a different context, the device may be configured so as to produce a wide illuminating beam and a narrow data transmission beam. This configuration, which is suitable for example for lighting desks in an open-space office, provides both for ambient lighting and transmission of data to a restricted zone.

The invention claimed is:

1. Illuminating device including a plurality of light sources mounted on a deck, characterized in that it includes:
    a first set of light sources placed in a central zone of the deck; and
    a second set of light sources placed in a peripheral zone of the deck,
    the light sources of one of the sets being configured for transmitting data by modulation of visible light, the light sources of the other set not being configured for transmitting data by modulation of visible light, the light sources of at least one of the sets being associated with at least one fixed convergent first lens positioned on the axis of one of said sources,
    the illuminating device being such that it furthermore includes, arranged parallel to the deck and superposed on the light sources and first lenses:
    a first element adapted to the central zone including a first set of divergent lenses, each of the lenses being arranged on the axis of a light source of the central zone; and
    a second element adapted to the peripheral zone including a second set of divergent lenses, each of the lenses being arranged on the axis of a light source of the peripheral zone,
    the first and second elements being further adapted to be able to move one relative to the other along a path perpendicular to the deck and mechanically coupled so that movement of the first element in a first direction is coupled with displacement of the second element in a second direction opposite to the first direction.

2. The illuminating device according to claim 1, characterized in that the light sources are LEDs.

3. The illuminating device according to claim 2, characterized in that it includes an adjusting mechanism suitable for applying a translation along an axis perpendicular to the deck to at least one of the sets of divergent lenses.

4. The illuminating device according to claim 1, characterized in that it includes an adjusting mechanism suitable for applying a translation along an axis perpendicular to the deck to at least one of the sets of divergent lenses.

5. The illuminating device according to claim 1 wherein the device comprises a housing and at least a first toothed wheel lying flush with the exterior of the housing so that it can be rotated by an action of the user, and a second toothed wheel arranged at the center of the housing and making contact with the first toothed wheel, the first and second toothed wheels being respectively fastened to a first and a second threaded rods at their center, the first and second threaded rods being configured so that a rotation of the first threaded rod in a corresponding tapped orifice in the second element allows a translation of the second element to be applied along a path perpendicular to the deck, and a rotation of the second threaded rod in a corresponding tapped orifice of the first element allows a translation of the first element to be applied along a path perpendicular to the deck and opposite of the path followed by the second element.

* * * * *